United States Patent [19]

Zielinski

[11] 4,056,686
[45] Nov. 1, 1977

[54] MULTIPLEXED SIGNAL REFERENCE LEVEL EQUALIZER

[75] Inventor: Martin Zielinski, Roslyn, Pa.

[73] Assignee: Honeywell Inc., Minneapolis, Minn.

[21] Appl. No.: 731,507

[22] Filed: Oct. 12, 1976

[51] Int. Cl.$^2$ .............................................. H04J 3/04
[52] U.S. Cl. ........................ 179/15 BL; 340/177 CA; 340/183; 340/211
[58] Field of Search ............ 179/15 BL; 340/177 CA, 340/182, 183, 184, 211

[56] References Cited

U.S. PATENT DOCUMENTS

| | | | |
|---|---|---|---|
| 3,258,538 | 6/1966 | Searcy | 179/15 BL |
| 3,535,458 | 10/1970 | Gottfried | 179/15 BL |

Primary Examiner—David L. Stewart

[57] ABSTRACT

A multiplexed signal reference level equalizer is arranged to provide an output signal which is a function of different selectable input signals wherein the input signals have respective reference, or common, signal levels. An input signal multiplexer is used to select an input signal from a plurality of remote variable signals or known local calibration signals. The selected remote signal has a common mode signal, represented by the difference between the remote signal common and a local common, superimposed on it. The combined signal is applied to the non-inverting input of a first operational amplifier. Concurrently, the common mode signal is amplified by a second operational amplifier and is applied to the inverting input of the first operational amplifier to be subtracted from the combined signal. A selected local input signal has the common mode signal superimposed on it before it is applied to the first operational amplifier for a similar common mode signal subtraction process. In this way, the equalizer circuit treats the selected local calibration signals in the same manner as a selected remote signal. By setting the various resistors in the circuit to predetermined resistance values, the relationship of the equalizing circuit output signal to its input signal is arranged to be 1.5 times the input signal selected by the multiplexer even though the input signals have different reference signal levels.

6 Claims, 1 Drawing Figure

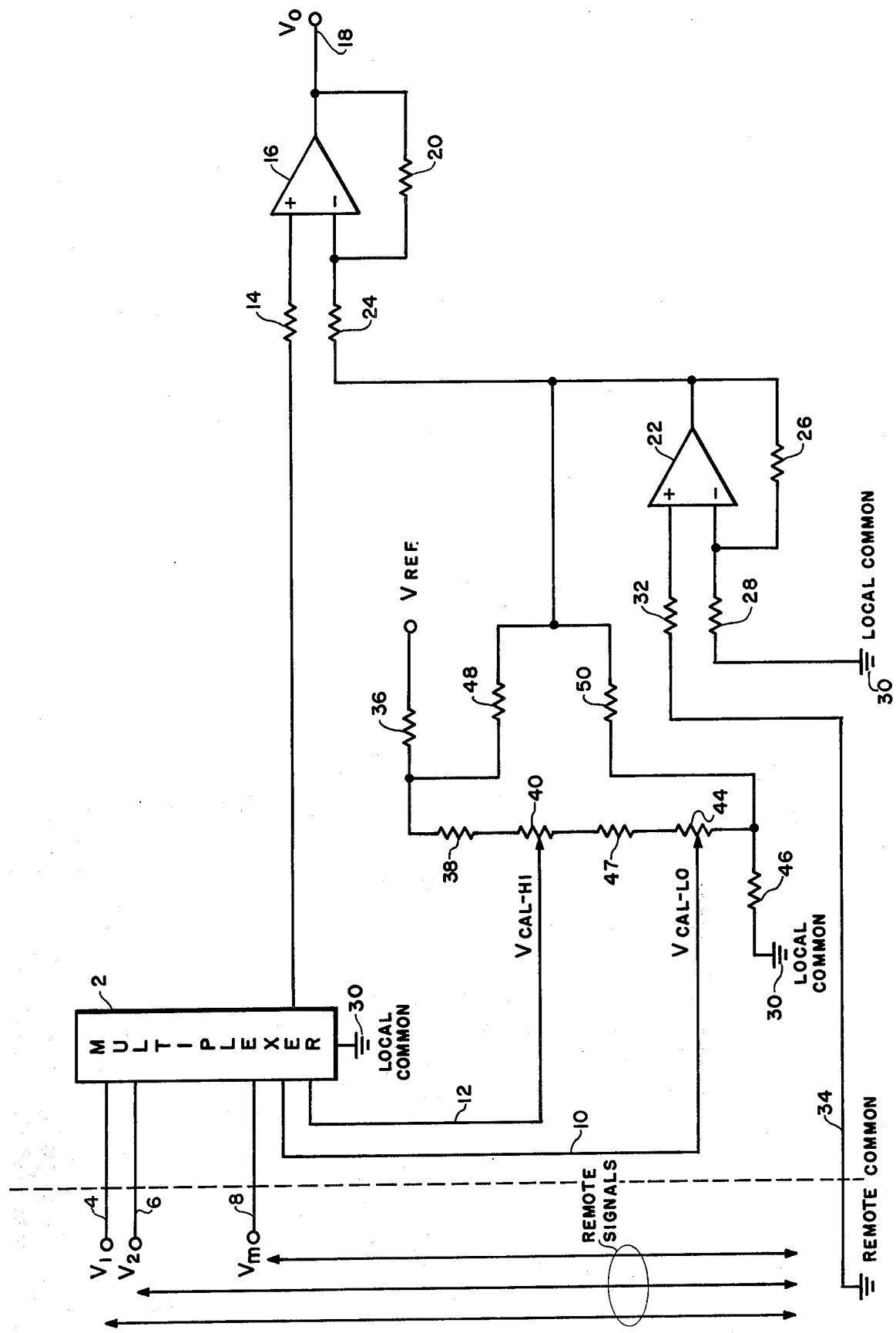

MULTIPLEXED SIGNAL REFERENCE LEVEL EQUALIZER

BACKGROUND OF THE INVENTION

1. Field Of The Invention

The present invention is directed to signal multiplexers. More specifically, the present invention is directed to a signal multiplexer circuit having a multiplexed signal reference level equalizer.

2. Description Of The Prior Art

The multiplexing of an input signal to a contemporary digital computer process control system involves a selection of a process signal from a plurality of remotely generated signals for application to a digital computer interface such as an analog-to-digital converter. In order to ascertain the operability of the interface, a known calibration signal is provided for selection according to a predetermined sequence. The calibration signal, thus, provides a known reference against which the operation of the interface can be checked. On the other hand, the calibration signal is usually generated locally while the process signals are remote, or field, generated signals which gives rise to a difference in signal common, or reference, levels. In order to allow the interface to accept either type of input signals, the local and remote signals must be equalized, i.e., the offset of their reference levels is compensated for, to allow either type of input signal to be utilized by the process control system.

SUMMARY OF THE INVENTION

The object of the present invention is to provide an improved signal multiplexer circuit having a signal equalizing capability for providing an output signal having a fixed relationship to selectable input signals generated either locally or remotely.

In accomplishing this and other objects, there has been provided, in accordance with the present invention, a signal multiplexing circuit having an input multiplexer arranged to select one of a plurality of input signals. The input signals are either remotely generated signals or locally generated signals. The remotely generated signals have a common mode signal which is the difference between the common signal level of the remote signal and a local common level superimposed thereon. A locally generated signal has the common mode signal superimposed thereon by the multiplexing circuit. The output signal from the multiplexer is applied to the non-inverting input of an operational amplifier while the inverting input of the operational amplifier is provided with the common mode signal. The operational amplifier is arranged to subtract the common mode signal from the selected input signal. The multiplexer circuit components are selected to provide an output signal from the multiplexer circuit which is 1.5 times the selected input signal for both the remote input signal and the local input signal.

BRIEF DESCRIPTION OF THE DRAWINGS

A better understanding of the present invention may be has when the following detailed description is read in connection with the accompanying drawing in which the single figure is the schematic illustration of a multiplexer circuit embodying the present invention.

DETAILED DESCRIPTION

Referring to the single figure drawing in more detail, there is shown a multiplexer and equalizer circuit having a multiplexer circuit 2 arranged to select one of a plurality of input signals. For purposes of illustration, the local multiplexer 2 is shown as being provided with three input signals applied to input lines 4, 6, and 8 and two locally generated signals applied to input lines 10 and 12. The output signal from the multiplexer is applied through a first resistor 14 to the non-inverting input of a first operational amplifier 16. The output signal from the operational amplifier 16 is applied to an output terminal 18 as a multiplexer output signal $V_o$ and through a feedback resistor 20 to the inverting input of the operational amplifier 16. A second input signal for the inverting input of the operational amplifier 16 is obtained from a circuit arranged to produce an output signal which is the common mode, or difference, signal between the local common signal level and the remote common signal level. Specifically, a second operational amplifier 22 is arranged to have its output connected through a resistor 24 to the inverting input of the first operational amplifier 16 and through a feedback resistor 26 to the inverting input of the second amplifier 22. The inverting input of the second amplifier 22 is also connected through a resistor 28 to the local common connection 30. The non-inverting input of the second amplifier 22 is connected through a resistor 32 to the remote common connection 34. Calibration, or local, signals to be used as two of the inputs for the multiplexer 2 are obtained from a signal dividing network connected between a reference signal source $V_{ref}$ and a local common connection 30. Thus, a series string of six resistors 36, 38, 40, 42, 44 and 46 are connected between the reference signal $V_{ref}$ and the local common 30. The third resistor 40 is a potentiometer having its slider connected to input line 12 of the multiplexer 2 while the fifth resistor 44 is also a potentiometer having its slider connected to input line 10 of the multiplexer 2. Thus, the third resistor 40 is arranged as a source of a high calibration signal while the fifth resistor is a source of a low calibration signal. A common mode signal from the second amplifier 22 is applied to applied to the calibration signal circuit from the junction of the first and second resistors 36 and 38 to the junction between the fifth and sixth resistors 44 and 46. Specifically, a pair of series resistors 48 and 50 are connected between the aforesaid junctions while the junction between these resistors is connected to the output line from the second operational amplifier 22 before the input resistor 24 of the first operational amplifier 16.

MODE OF OPERATION

In operation, the multiplexer circuit of the present invention shown in FIG. 1 is effective to provide an output voltage which is a function of a preselected one of a plurality of input signals to a multiplexer 2. While, for purposes of illustration, three remote input signals and two calibration input signals have been shown it should be noted that other numbers of remote signals and calibration signals could be handled by the circuit with a conventional modification of the multiplexer 2 and the calibration signal circuitry. Referring to the single figure drawing, the output signal $V_o$ can be a function of one of the remote input signals $V_1$, $V_2$ and $V_3$ or one of the calibration signals $V_{cal-lo}$ and $V_{cal-li}$. If a remote input signal is selected by the multiplexer 2, the multiplexer output signal will be a function of the selected remote signal and a common mode signal which is the difference between the signal level of the remote common and the local common. The reference level equalizing portion of the multiplexer circuit of the present invention is arranged to subtract the common mode signal from the selected remote signal to produce a multiplexer circuit output signal $V_o$ that is independent of the common mode signal and has a fixed relationship to the selected remote input signal. Similarly, for a local input signal selected by the multiplexer 2, the common mode signal is added to the selected local signal and is subsequently subtracted as in the case of the selected remote input signal. Thus, in either case, the multiplexer circuit of the present invention is effective to produce an output signal $V_o$ which is a fixed function of the selected input signal independently of the common mode signal, or common signal levels of the input signals.

The multiplexer selected remote signal with the common mode signal superimposed upon it is applied to the non-inverting (+) input of the first amplifier 16 through the input resistor 14. Concurrently, the common mode signal is separately developed by applying the local common and remote common levels to the respective inputs of the second amplifier 22. Thus, the remote common signal level is applied to the non-inverting input of the amplifier 22 over line 34 and through input resistor 32 while the local common signal level is applied to the inverting input of the amplifier 22 through the input resistor 28. The output signal from the second amplifier 22 is, accordingly, the common mode signal $V_{cm}$, multiplied by the transfer function of the second amlifier 22. The output signal $V_o$ is:

$$V_o = (V_{remote} + V_{cm})\left(1 + \frac{R20}{R24}\right) - \left(\frac{R20}{R24} V_{cm}\right)\left(1 + \frac{R26}{R28}\right) \quad (1.)$$

which can be simplified to:

$$V_o = V_{remote}\left(1 + \frac{R20}{R24}\right) + V_{cm}\left(1 - \frac{R20\ R26}{R24\ R28}\right)$$

If the circuit resistors are selected as follows:

R48 = R50 = R

R36 = R46 = R/2

R24 = 2R20

R26 = 2R28 then the above expression for $V_o$ when a remote signal is selected can be simplified as follows:

$$V_o = V_{remote}\left(1 + \frac{R20}{R24}\right) + V_{cm}\left(1 - \frac{R20\ R26}{R24\ R28}\right)$$

$$V_o = V_{remote}\left(1 + \frac{R20}{2R20}\right) + V_{cm}\left(1 - \frac{R20\ 2R28}{2R20\ R28}\right)$$

(2.) $V_o = 1.5\ V_{remote}$

Similarly, if a local calibration signal is selected, the common mode signal from the amplifier 22 is superimposed on it by the resistor 48 and 50 to enable the equalizing circuit of the present invention to handle the remote and local signals in a similar manner. The expression for determining $V_{cal-lo}$ is:

$$V_{cal-lo} = \frac{V_{ref}[(1-\alpha)(1.5R44) + 0.5R]}{2.25\ R_T + 1.5R}$$

$$+ \frac{V_{cm}\left(1 + \frac{2R28}{R28}\right)(0 + .75\ R_T + 0.5R)}{3(.75\ R_T + 0.5R)}$$

$$V_{cal-lo} = \frac{V_{ref}(1-\alpha)(1.5R44) + 0.5R}{2.25\ R_T + 1.5R} + \frac{3}{3}V_{cm} \quad (3.)$$

where
$R_T$ = R38 + R40 + R42 + R44
$\alpha$ = position of slider of first potentiometer 40
$V_{ref}$ = stable signal level source The expression for the output signal $V_o$ when $V_{cal-lo}$ is selected as an input signal is:

$$V_o = V_{cal-lo}\left(1 - \frac{R20}{R24}\right) - \frac{R20}{R24}V_{cm}\left(1 - \frac{R26}{R28}\right)$$

This can be simiplified using the aforesaid resistance value relationships to:

$$V_o = V_{cal-lo}\left(1 + \frac{R20}{2R20}\right) - V_{cm}\left(\frac{R20}{2R20}\right)\left(1 + \frac{2R28}{R28}\right)$$

(4.) $V_o = 1.5\ V_{cal-lo} - 1.5\ V_{cm}$ Substituting the expression for $V_{cal-lo}$, Eq. 3 into Eq. 4 gives:

$$V_o = \frac{1.5\ V_{ref}[(1-\alpha)1.5\ R44 + 0.5R]}{2.25\ R_T + 1.5\ R} + 1.5\ V_{cm} - 1.5\ V_{cm}$$

Hence, since the common mode signal, $V_{cm}$, quantities cancel, $V_o$ is effectively 1.5 times the $V_{ref}$. Thus, the output signal $V_o$ is 1.5 times either a selected remote signal or effectively 1.5 times $V_{ref}$ when $V_{cal-lo}$ is selected. The 1.5 factor is based on the particular circuit components while the equalization circuit of the present invention, in general, handles these input signals in the same manner even though these two multiplexed input signals have different signal common levels. The same relationship can be shown to exist for a selection of $V_{cal-hi}$ with the position of the slider of potentiometer 40 being used, e.g.,$\beta$, instead of the $\alpha$ term used for the $V_{cal-lo}$ expression.

Accordingly, it may be seen that there has been provided in accordance with the present invention, a reference voltage equalizing circuit for compensating multiplexed input signals having different signal common levels.

The embodiments of the invention in which an exclusive property or privilege is claimed are defined as follows:

1. A multiplexer comprising
   multiplexer means for selecting one of a plurality of input signals as an output signal from said multiplexer means,
   first circuit means for applying a plurality of remotely generated input signals to said multiplexer means,
   local signal means for generating at least one local input signal for said multiplexer means, second circuit means for applying said local input signal as another input signal to said multiplexer means, common mode signal means for producing a common mode signal representative of the difference between a common signal level of said remotely generated input signals and a local common signal level of said local input signal, means for adding said common mode signal to said local input signals, and means for subtracting said common mode signal from an output signal from said multiplexer means.

2. A multiplexer as set forth in claim 1 wherein said means for subtracting includes an operational amplifier having a first inverting input and second non-inverting input, third circuit means connecting said first input to an output of said common mode signal means, and forth circuit means connecting said second input to an input of said multiplexer means.

3. A multiplexer as set forth in claim 2 wherein said common mode signal means includes a second operational amplifier having an inverting input and a non-inverting input, fifth circuit means connecting said inverting input of said second amplifier to a local common signal level source and sixth circuit means connecting said non-inverting input of said second amplifier to a remote common signal level source.

4. A multiplexer as set forth in claim 1 wherein said means for adding includes a seventh circuit means connecting an output signal from said common mode signal means as an input to said local signal means.

5. A multiplexer as set forth in claim 4 wherein an output signal from said subtracting means is 1.5 times an input signal to said multiplexer means.

6. A method for multiplexing remote and local signals comprising the steps of selecting ones of remote and local input signals, generating a common mode signal representing the difference between a common signal level of the remote input signals and a common signal level of the local input signals, adding the common mode signal to the local input signals and subtracting the common mode signal from the selected ones of the remote and local input signals.

* * * * *